(12) United States Patent
Rhee et al.

(10) Patent No.: US 12,155,053 B2
(45) Date of Patent: Nov. 26, 2024

(54) BATTERY MODULE COMPRISING THERMAL BARRIER AND PACK

(71) Applicant: SK Innovation Co., Ltd., Seoul (KR)

(72) Inventors: Seo Roh Rhee, Daejeon (KR); Tae Il Kim, Daejeon (KR); Ho Yeon Kim, Daejeon (KR); Kang Gu Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 17/464,921

(22) Filed: Sep. 2, 2021

(65) Prior Publication Data
US 2022/0069377 A1    Mar. 3, 2022

(30) Foreign Application Priority Data
Sep. 2, 2020   (KR) .................. 10-2020-0111524

(51) Int. Cl.
| | |
|---|---|
| *H01M 10/658* | (2014.01) |
| *H01M 10/04* | (2006.01) |
| *H01M 10/613* | (2014.01) |
| *H01M 10/647* | (2014.01) |
| *H01M 10/653* | (2014.01) |
| *H01M 10/6554* | (2014.01) |
| *H01M 50/209* | (2021.01) |
| *H01M 50/24* | (2021.01) |

(52) U.S. Cl.
CPC ..... *H01M 10/658* (2015.04); *H01M 10/0413* (2013.01); *H01M 10/613* (2015.04); *H01M 10/647* (2015.04); *H01M 10/653* (2015.04); *H01M 10/6554* (2015.04); *H01M 50/209* (2021.01); *H01M 50/24* (2021.01)

(58) Field of Classification Search
CPC ............. H01M 10/658; H01M 10/613; H01M 10/647; H01M 10/653; H01M 10/6554; H01M 10/0413; H01M 50/24; H01M 50/209
See application file for complete search history.

(56) References Cited

U.S. PATENT DOCUMENTS

| | | | | |
|---|---|---|---|---|
| 2,953,466 A | * | 9/1960 | Brown | .................... C04B 26/32 |
| | | | | 106/287.11 |
| 2019/0020079 A1 | * | 1/2019 | Lee | ........................ H01M 50/24 |

FOREIGN PATENT DOCUMENTS

| | | | | |
|---|---|---|---|---|
| KR | 10-2014-0089456 A | | 7/2014 | |
| KR | 10-2019-0008728 A | | 1/2019 | |
| KR | 10-2019-0044872 A | | 5/2019 | |
| WO | WO-2010143408 A1 | * | 12/2010 | ............ H01M 2/105 |
| WO | WO-2019187313 A1 | * | 10/2019 | .......... H01M 10/613 |
| WO | WO-2020152857 A1 | * | 7/2020 | |

\* cited by examiner

*Primary Examiner* — Jimmy Vo
(74) *Attorney, Agent, or Firm* — IP & T GROUP LLP

(57) ABSTRACT

The present disclosure relates to a high voltage battery module and a pack, in which a thermal barrier is mounted, and, more particularly, relates to a battery module comprising a cell assembly stacked with a plurality of secondary battery cell; a housing accommodating the cell assembly, a thermal barrier is placed in the housing, wherein the thermal barrier comprises a heat resistant layer to prevent propagation of heat or flame from a secondary battery cell to an neighboring secondary battery cell.

14 Claims, 7 Drawing Sheets

BATTERY MODULE COMPRISING THERMAL BARRIER AND PACK

CROSS-REFERENCE TO RELATED APPLICATION(S)

This application claims benefit of priority to Korean Patent Application No. 10-2020-0111524 filed on Sep. 2, 2020 in the Korean Intellectual Property Office, the disclosure of which is incorporated herein by reference in its entirety.

BACKGROUND

1. Field

The present disclosure relates to a high voltage battery module and a pack, in which a thermal barrier is mounted.

2. Description of Related Art

As technology development and demand for mobile devices, electric vehicles, or the like increase, demand for a secondary battery as an energy source is rapidly increasing. A secondary battery is a battery that can be repeatedly charged and discharged because mutual conversion between chemical energy and electrical energy is reversible.

Figure 1:
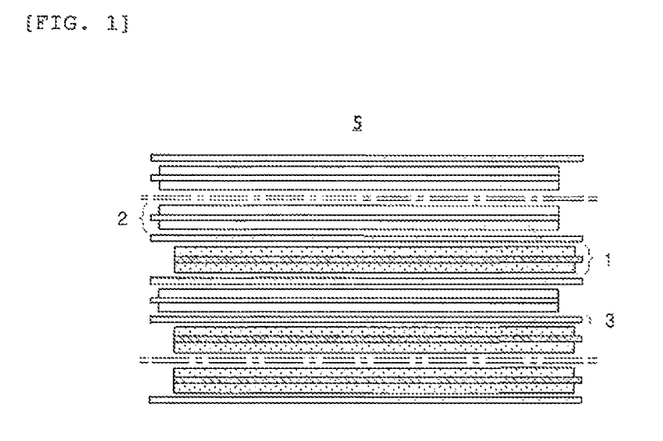
FIG. 1 is a front view of an electrode assembly in which a plurality of negative electrodes and positive electrodes are alternately stacked with a separator interposed therebetween.
Figure 2:
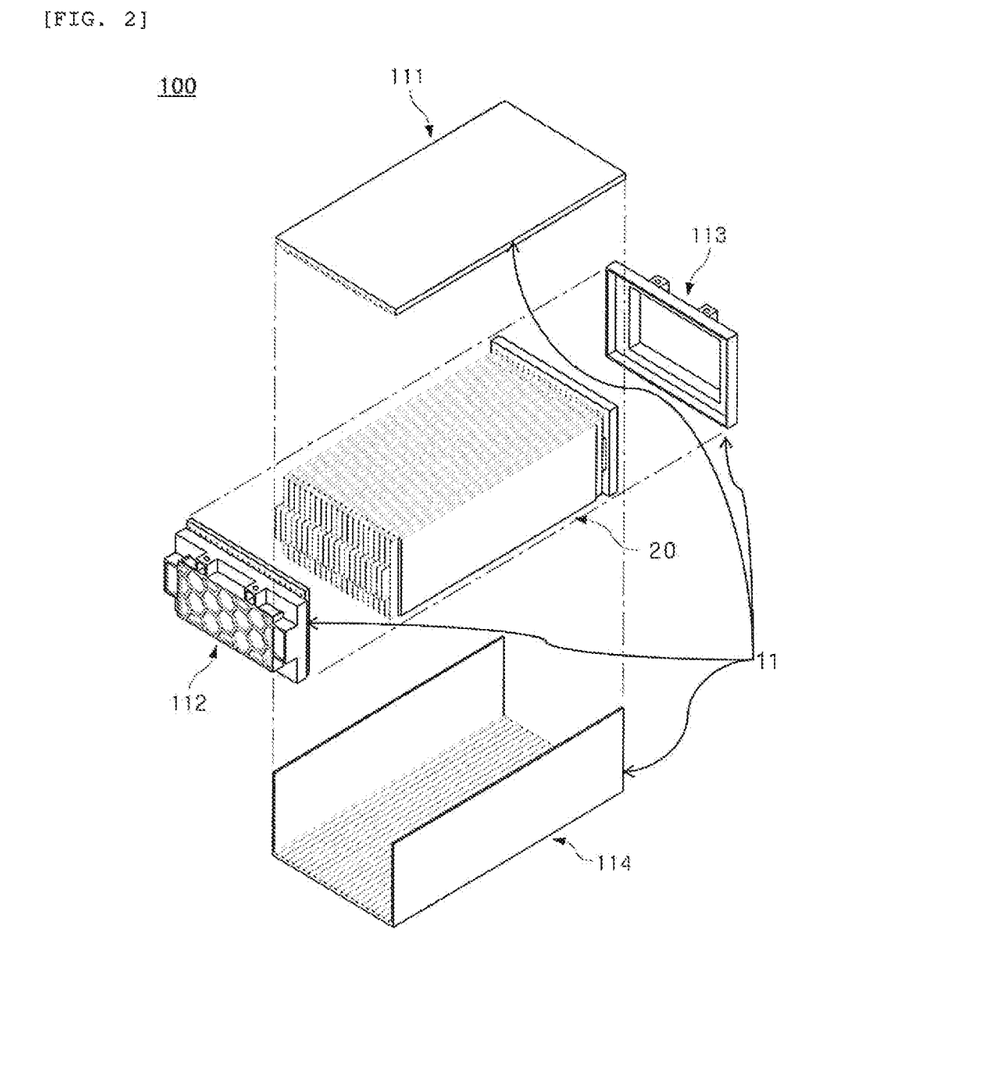
FIG. 2 is a view schematically illustrating a structure of a battery module.

As illustrated in FIG. 1, such a secondary battery may include an electrode assembly 5 and an electrolyte in which positive and negative electrodes 1, 2 are alternately stacked with a separator 3 as a main component, and the electrode assembly 5 and the electrolyte may be accommodated and sealed in a battery case to form a secondary battery cell. In addition, the secondary battery cell may be provided as a plurality of secondary battery cells to form a battery module as illustrated in FIG. 2, and the battery module 100 may be also installed in an electric vehicle, an energy storage system (ESS), or the like.

However, the secondary battery cell may generate heat while undergoing charging and discharging, and such an increase in temperature due to the heat generation may deteriorate performance of the secondary battery cell.

In addition, any one of the secondary battery cells may explode due to an internal factor of the battery module, such as such an increase in temperature of the secondary battery cell, or any one of the secondary battery cells may explode due to an external impact. In these cases, there may be a problem causing a chain explosion in other secondary battery cells in the battery module.

In particular, in a pouch-type secondary battery cell in which a pouch is used as the case, when a thermal runaway phenomenon occurs under conditions such as penetration, overcharging, overdischarging, standing placement under high temperature, or the like, heat and gas may be generated due to formation of an SEI layer. In this case, the pouch may be vented by high-pressure gas, heat may be accumulated due to an internal short-circuit by contraction of a separator, and a thermal runaway situation may occur. In addition, when such a thermal runaway phenomenon occurs, oxygen may be generated to further accelerate heat generation, as a structure of a positive electrode material collapses, leading to a situation in which an increase in temperature of the secondary battery cell cannot be controlled.

In such a thermal runaway situation, gas and flame due to the explosion of any one secondary battery cell may not be rapidly discharged to the outside. Therefore, other secondary battery cells may be reacted by thermal propagation, flame, high temperature and high pressure gas, or the like, to cause a chain of explosions to lead to bigger problems.

Under the thermal runaway situation as described above, there is a need to study a means for blocking heat transfer from one secondary battery cell to an adjacent secondary battery cell.

SUMMARY

An aspect of the present disclosure is to provide a battery module having excellent stability and a means for delaying propagation of heat and/or flame between secondary battery cells under a thermal runaway situation of a high voltage secondary battery, and a pack including the battery module.

According to an aspect of the present disclosure, the battery module comprises a cell assembly stacked with a plurality of secondary battery cell; a housing accommodating the cell assembly, a thermal barrier is placed in the housing, wherein the thermal barrier comprises a heat resistant layer to prevent propagation of heat or flame from a secondary battery cell to an neighboring secondary battery cell.

In the battery module, the secondary battery cells may be a pouch-type secondary battery cell in which the electrode assembly is accommodated in a pouch case.

In the battery module, the heat resistant layer may include at least one mica sheet comprising mica in an amount of 90% to 99% by weight and a binder in an amount of 1% to 10% by weight.

In the battery module, the heat resistant layer may have a thickness of 0.2 to 3.0 mm.

In the battery module, the thermal barrier may include two heat resistant layers and a rigid mechanical layer disposed between the two heat resistant layers.

In the battery module, the rigid mechanical layer may be at least one of a film, a woven fabric, a non-woven fabric, or foam, and is made of a material selected from at least one of plastic, steel, ceramic, super wool, and silicone, having a melting point of 150° C. or higher.

In the battery module, the plastic may be at least one selected from polyethylene terephthalate (PET), polyimide, fluororesin, or carbon-fiber-reinforced-polymers (CFRP) in which a carbon fiber is included in any one thereof.

In the battery module, the rigid mechanical layer may have a thickness of 0.1 to 1.0 mm.

In the battery module, the thermal barrier may have a thickness of 1.0 to 4.0 mm.

The battery module may further comprise an adhesive layer between the two heat resistant layers, between the rigid mechanical layer and the two heat resistant layers, or in an outermost portion of the thermal barrier.

In the battery module, the adhesive layer may be a pressure sensitive adhesive or a hot melt adhesive made of a silicone-based adhesive, an acrylic-based adhesive, a rubber-based adhesive, or an epoxy-based adhesive.

The battery module may further comprise a pad layer preventing swelling of the secondary battery cells, wherein the pad layer is disposed between the rigid mechanical layer and the heat resistant layer.

In the battery module, the pad layer may have a compressibility of 20 to 50% in a thickness direction of the pad layer.

In the battery module, the thermal barrier may be located in at least one of the following: i) between one secondary battery cell among the plurality of secondary battery cells accommodated in the housing and a neighboring secondary battery cell adjacent thereto; ii) between an cell tab of the one secondary battery cell and an cell tab of the neighboring secondary battery cell; and iii) in an upper space of the housing above the plurality of secondary battery cells accommodated in the housing.

According to another aspect of the present disclosure, a pack comprises the battery module.

According to another aspect of the present disclosure, a battery module comprises a housing including an upper cover with a sensing module, a lower cover with a cooling plate, a front cover and a rear cover, a plurality of secondary battery cells stacked within the housing, and a plurality of thermal barriers, each thermal barrier being disposed between adjacent secondary battery cells, wherein each thermal barrier includes a rigid mechanical layer disposed between two heat resistant layers.

The plurality of secondary battery cells are pouch-type secondary battery cells in which an electrode assembly is accommodated in a pouch case.

The heat resistant layers include at least one mica sheet comprising a larger amount of mica and a smaller amount of a binder.

Each of the heat resistant layers has a thickness of 0.2 to 3.0 mm.

The rigid mechanical layer is at least one of a film, a woven fabric, a non-woven fabric, or a foam, and is made of a material selected from at least one of plastic, steel, ceramic, super wool, and silicone, having a melting point of 150° C. or higher.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

The present disclosure may provide a battery module having a thermal barrier preventing heat or flame from transferring and spreading to other adjacent secondary battery cells, when a thermal runaway or flame occurs in a secondary battery cell in a housing accommodating the secondary battery cells.

AS illustrated in FIG. 2, a battery module 100 of the present disclosure may be a battery module in which a cell assembly 20 are accommodated in a housing 110, wherein the cell assembly 20 may include an electrode assembly 5 in which a plurality of negative electrodes 1 and a plurality of positive electrodes 2 are alternately stacked with a separator 3 interposed therebetween, and the electrode assembly 5 may be accommodated in a battery case. The battery case is not particularly limited, may be a pouch type case using a laminate sheet, and may be a rectangular or cylindrical can. Hereinafter, a pouch-type secondary battery cell will be described in detail as an example.

AS illustrated in FIG. 2, the housing 110 includes an upper cover 111, a lower cover with a cooling plate 114, a front cover 112 and a rear cover 113, wherein the upper cover 111 may comprise a sensing module.

The battery module 100 of the present disclosure may include a thermal barrier in the housing 110. The thermal barrier provided in the present disclosure may include a heat resistant layer. When a situation such as thermal runaway or flame generation occurs in any one of the secondary battery cells, the thermal barrier may block transfer of the flame and may block transfer of the heat while maintaining a shape of a sheet for thermal insulation, to prevent diffusion thereof to other adjacent secondary battery cells, to maintain stability of the module.

The heat resistant layer may serve to prevent propagation of heat or flame from a secondary battery cell in which ignition or heat is generated to an adjacent secondary battery cell, and a mica including sheet may be used therein.

The mica sheet may be a sheet having a uniform thickness manufactured using mica, and may be prepared from a composition including mica as a main component and a small amount of a binder. For example, the mica may be included in 90% or more, and the binder may be included in 10% by weight or less, and, for example, the mica may be included in an amount of 90 to 99% by weight, and the binder may be included in an amount of 1 to 10% by weight.

The mica may use muscovite or phlogopite, and a mixture thereof may be used. The binder is not particularly limited, and any organic or inorganic binder binding mica and having heat resistance while maintaining a shape of the sheet may be suitably used.

The heat resistant layer may be a single layer, may be provided as two or more layers, and is not particularly limited. For example, one mica sheet having a predetermined thickness or a stacked body having a predetermined thickness in which two or more mica sheets are stacked may be configured as a heat resistant layer, and the heat resistant layer may be provided as two or more heat resistant layers, which are stacked to form a thermal barrier. Preferably, the thermal barrier of the present disclosure may include two heat resistant layers.

The mica sheet may have a thermal conductivity of 0.2 W/mK or less according to ISO 22007-2 at room temperature, to perform a function as a heat resistant layer, and may have heat resistance characteristics such as a heat resistant temperature (e.g., a difference in temperature between flame contact surface and back temperature) of 500° C. or more (continuous services) and 1,000° C. or more (intermittent services) according to FMVSS-302.

In addition, the mica sheet may have electrical characteristics such as a dielectric breakdown voltage of 15 kV/min or more according to ASTM D-1000, and an insulation resistance of 40 Mohm or more according to ASTM D-257 at 850° C.

Furthermore, the mica sheet may have a tensile strength of 145 MPa or more according to ISO 327 or ASTM D638, a flexural strength of 200 MPa or more according to ISO178 or ASTM D790, and an impact strength of 18 kJ/m² or more according to ISO179 or ASTM D256. In the module having the properties within the above range, occurrence of deformation due to a swelling phenomenon of a secondary battery cell, a pouch tearing phenomenon due to rupture of the secondary battery cell, or the like may be prevented, and a structure of the secondary battery cell may be maintained under a vehicle vibration/shock situation, to protect the secondary battery cell.

The thermal barrier of the present disclosure may include a rigid mechanical layer between the heat resistant layers. The rigid mechanical layer may serve to maintain morphological stability of the thermal barrier under a thermal runaway situation, and may serve to maintain mechanical rigidity to prevent oil and particles from propagating to adjacent secondary battery cells. Specifically, the rigid mechanical layer may have excellent properties such as hardness, tensile strength, flexural strength, breaking strength, and the like, and may prevent structural collapse of the thermal barrier. Therefore, a material physically preventing the thermal barrier from being damaged by flame, gas, oil, particles, or the like may be suitably used as the rigid mechanical layer in the present disclosure.

For example, the rigid mechanical layer may be a plastic material having a melting point of 150° C. or higher, and may be made of a material such as steel, stainless steel, ceramic, super wool, silicone, or the like. In the present disclosure, more preferably, the rigid mechanical layer may maintain mechanical rigidity of the thermal barrier under a condition in which heat of 500° C. or higher is generated. Although a plastic material may usually have a melting point lower than 500° C., the plastic material may be suitably used as a material for the rigid mechanical layer of the present disclosure, since the thermal barrier of the present disclosure has heat resistant layers on both sides of the rigid mechanical layer. The plastic material may include, for example, PET, polyimide, polyurethane, PVC, fluororesin, or the like, and these may be CFRP with which a carbon fiber is reinforced.

Since the thermal barrier of the present disclosure has a sheet shape, the rigid mechanical layer may also have a sheet shape. For example, the rigid mechanical layer may be in the form of a film made of the above-mentioned material, may be woven fabric or non-woven fabric, and further may be in a foam form.

Figure 3:
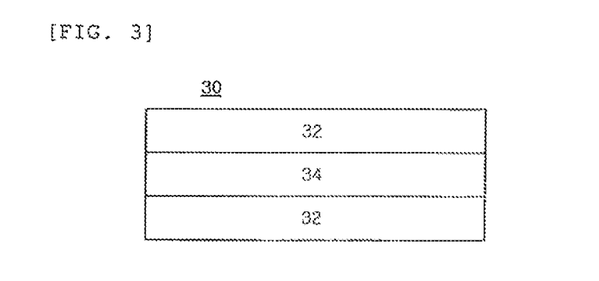
FIG. 3 is a view schematically illustrating a cross-sectional structure of a thermal barrier according to an embodiment of the present disclosure.

As illustrated in FIG. 3, the thermal barrier 30 according to the present disclosure may include the heat resistant layer 32 as described above, and, in an embodiment, may include a rigid mechanical layer 34 and a heat resistant layer 32, and, may be a stacked body including a rigid mechanical layer 34 and heat resistant layers 32 on both sides of the rigid mechanical layer 34.

The rigid mechanical layer 34 is not limited thereto, but may have a thickness of 0.1 to 1.0 mm. When a thickness of the rigid mechanical layer 34 is less than 0.1 mm, the rigid mechanical layer 34 may be collapsed by ignition, making it difficult to secure shape stability of the thermal barrier 30. When a thickness of the rigid mechanical layer 34 exceeds 1.0 mm, a decrease in energy density and an increase in weight of the battery may be caused. In addition, when bending of the battery is required, it may be difficult to process the battery. As the rigid mechanical layer 34, one sheet having a thickness in the above range may be used, and, of course, a stacked sheet in which two or more sheets are stacked to have a thickness in the above range may be used.

The heat resistant layer 32 may have a thickness of 0.2 to 3.0 mm. When a thickness of the heat resistant layer 30 is less than 0.2 mm, effects of blocking heat and flames to adjacent secondary battery cells may not be sufficient. When a thickness of the heat resistant layer 32 exceeds 3 mm, a total thickness of the thermal barrier 30 may increase to reduce energy density and increase weight. The heat resistant layer 32 may also be a stacked sheet in which two or more mica sheets are stacked to have a thickness in the above range, as well as a single mica sheet having a thickness in the above range.

When the thermal barrier 30 has a stacked structure of heat resistance layer 32/rigid mechanical layer 34/heat resistance layer 32 in which the heat resistance layers 32 are stacked on both sides of the rigid mechanical layer 34, heat or flame generated in any one secondary battery cell may be prevented from spreading to another adjacent secondary battery cells. A thickness of the thermal barrier 30 may be in inverse proportion to energy density of the secondary battery cell 10. When a thickness of the thermal barrier 30 is too thick, energy density of the secondary battery cell may be excessively reduced. Therefore, the thermal barrier may have a thickness of 1.0 to 4.0 mm in consideration of energy density of the secondary battery cell.

Figure 4A:
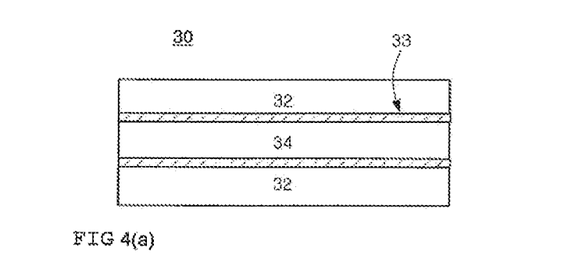
FIGS. 4(a)-4(b) are views schematically illustrating a cross-sectional structure of a thermal barrier according to other embodiments of the present disclosure.

The thermal barrier 30 of the present disclosure may include an adhesive layer 33 between the rigid mechanical layer 34 and the heat resistant layer 32 or in an outermost portion of the thermal barrier 30, as illustrated in FIG. 4(a). The adhesive layer 33 may prevent relative flow between the secondary battery cells 30, and the adhesive layer 33 may use an adhesive such as a silicone-based adhesive, an acrylic-based adhesive, a rubber-based adhesive, or an epoxy-based adhesive, and may be a pressure sensitive adhesive (PSA) adhesive or a hot melt adhesive.

The adhesive layer 33 is not particularly limited as long as it is fixed by bonding the rigid mechanical layer 34 and the heat resistance layer 32 to each other, but an inorganic double-sided tape made of only an adhesive may be used, and a double-sided tape in which the adhesive is applied to both sides of a substrate may also be used. In this case, the substrate may be made of, for example, PET, polyimide, fluororesin, PVC, and the like, and may have a form of a film, foam, a non-woven fabric, a filament, a woven fabric, or the like.

The adhesive layer 33 may have a shear strength of 30 kgf/in² or more (measured by attaching to an SUS substrate after removing a release paper at room temperature according to ASTM D5656). It is preferable that the adhesive layer 33 has a higher shear strength, and an upper limit thereof is not particularly limited. For example, the adhesive layer 33 may have a shear strength of 300 kgf/in² or less.

The adhesive layer 33 may have a 180° peel strength of 500 gf/in or more (ASTM D1000).

The adhesive layer 33 is not particularly limited, but, for example, may have a thickness of 0.01 to 0.1 mm. When a thickness of the adhesive layer 33 is less than 0.01 mm, it may not be sufficient to prevent of the secondary battery cells. When a thickness of the adhesive layer 33 exceeds 0.1 mm, a thickness of the thermal barrier 30 may increase to relatively reduce battery capacity.

Figure 4B:
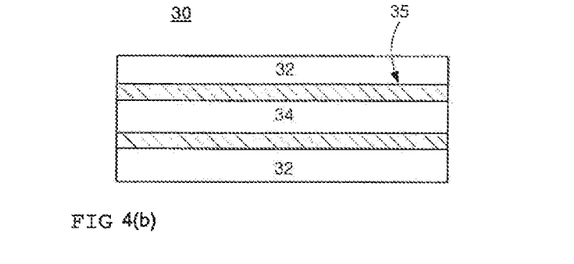

As illustrated in FIG. 4(b), the thermal barrier 30 of the present disclosure may include a pad layer 35 between the rigid mechanical layer 34 and the heat resistance layer 32, and the pad layer 35 may serve to prevent swelling of the secondary battery cell by providing a specific surface pressure to the secondary battery cell. For the pad layer 35, a material having a compressibility of 20 to 50% in a thickness direction may be applied, but is not limited thereto, and, for example, may be a pad made of a material such as polyurethane, silicone, or melamine.

The pad layer 35 may have a thickness of 0.5 to 5 mm. When a thickness of the pad layer 35 is less than 0.5 mm, there may be a problem that a maximum compression rate of the pad layer 35 is reached quickly under swelling of the secondary battery cell, to complete a lifespan thereof quickly. When a thickness of the pad layer 35 exceeds 5 mm, there may be a problem that energy density of the battery module 100 decreases.

The thermal barrier 30 according to the present disclosure may be appropriately disposed at a position in which it is necessary to block propagation of heat and flame in the housing 110 of the module in which the cell assembly 20 is accommodated.

Figure 5:
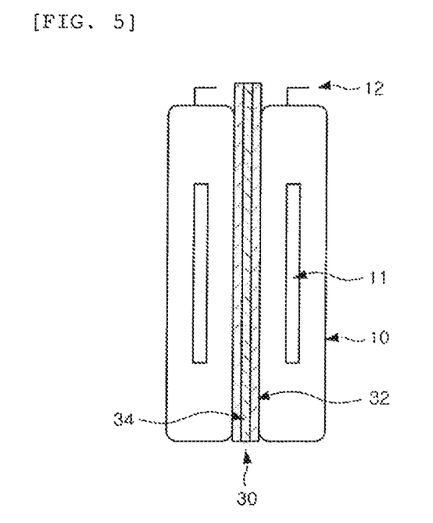
FIG. 5 is a view schematically illustrating a position in which a thermal barrier is disposed between a secondary battery cell and an adjacent secondary battery cell in a battery module of the present disclosure.

Specifically, as illustrated in FIG. 5, a thermal barrier 30 may be disposed between secondary battery cells 10 accommodated in a housing 110. When heat and gas are generated to occur thermal runaway and flame in any one of the secondary battery cells 10 due to penetration, overcharging, overdischarging, standing placement under high temperature, or the like, it may be prevented from transferring to an adjacent secondary battery cell 10 by the thermal barrier 30.

Figure 6:
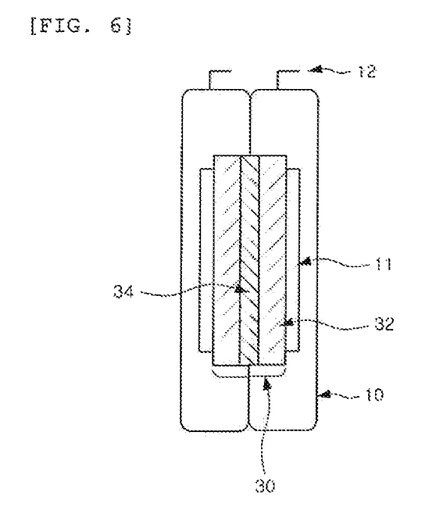
FIG. 6 is a view schematically illustrating a position in which a thermal barrier is disposed between a cell tab of a secondary battery cell and a cell tab of an adjacent secondary battery cell in a battery module of the present disclosure.

In another embodiment, as illustrated in FIG. 6, a thermal barrier 30 may be disposed between a cell tab 11 of a secondary battery cell 10 and a cell tab 12 of a secondary battery cell 10, accommodated in a housing 110. Typically, a cell tab 11 of a secondary battery cell 10 may be welded to an uncoated portion of an electrode current collector by laser, ultrasonic waves, or the like. In the welding, a large amount of heat may be generated according to intensity of a welding machine. Therefore, heat or flame generated in the cell tab 11 of any one of the secondary battery cells 10 may be blocked from propagating to an adjacent cell tab 11 by the thermal barrier 30.

Figure 7:
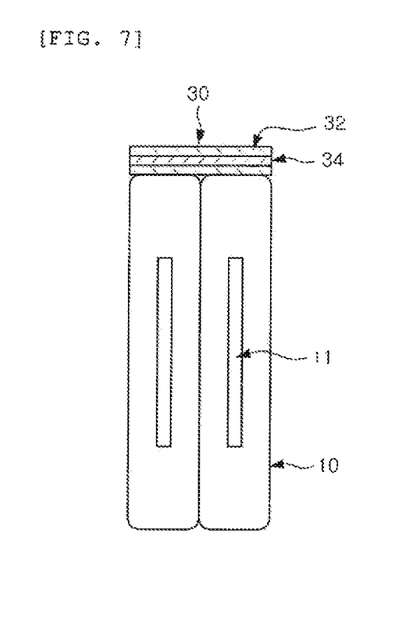
FIG. 7 is a view schematically illustrating a position in which a thermal barrier is disposed on a secondary battery cell in a battery module of the present disclosure.
Figure 8A:
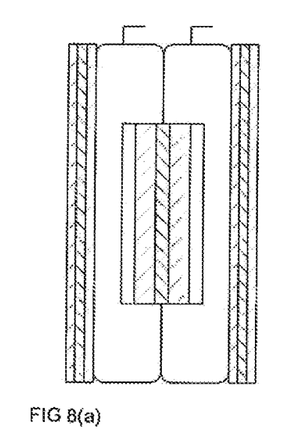
FIGS. 8(a)-8(d) are views schematically illustrating additional forms in which a thermal barrier is disposed in a battery module of the present disclosure.
Figure 8B:
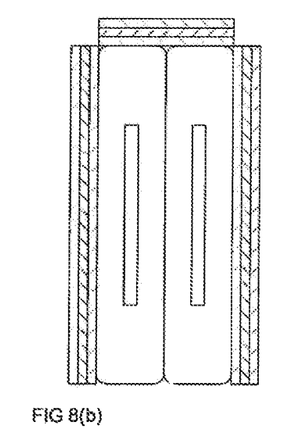
Figure 8C:
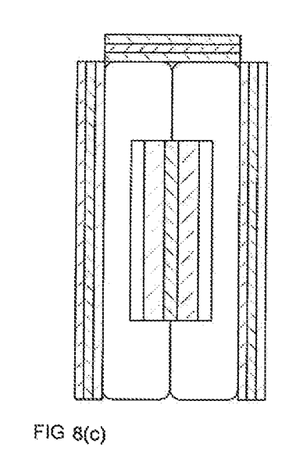
Figure 8D:
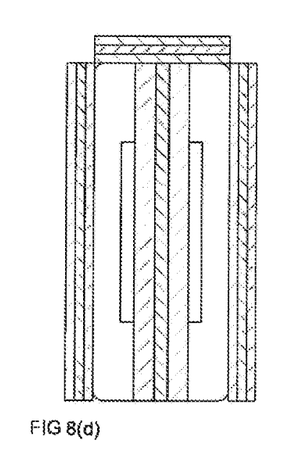

As another embodiment, as illustrated in FIG. 7, a thermal barrier 30 may be disposed in an upper space of a housing 110 above secondary battery cell 10 accommodated in the housing 110. As illustrated in FIG. 2, the housing 110 may generally include a cooling plate 114, a front cover 112, a rear cover 113, and an upper cover 111, and a secondary battery cell 10 may be accommodated to face a cell tab 11 in a direction toward the front cover 112. Under an ignition situation, heat, flame, oil, particles, or the like may be ejected in all directions. When ejected in a direction toward the upper space of the secondary battery cell 10, it may be reflected again by the upper cover 111 of the battery module 100, to eject the same along an empty space in an adjacent secondary battery cell 10 or module 100. This may cause another thermal runaway. Therefore, the thermal barrier 30 may be disposed on a side surface of the secondary battery cell 10 located under the upper cover 111 of the housing 110, to block a heat propagation path to an adjacent secondary battery cell 10 under ignition of the cell 10.

Furthermore, the thermal barrier 30 may be disposed in any one position as described above, and may be disposed simultaneously in two or more positions among the positions illustrated in the above embodiments. Configurations for thermal barrier arrangement may be illustrated in drawings of FIG. 8.

According to the present disclosure, thermal runaway or flame generated in any one secondary battery cell 10 may be prevented from propagating to an adjacent secondary battery cell by disposing a thermal barrier 30 provided in the present disclosure in a module, and loss of function of all secondary battery cells accommodated in the module may be prevented.

EXAMPLE

Hereinafter, the present disclosure will be described in more detail through examples. However, the following examples may be specific examples for practicing the present disclosure, and are not intended to limit the present disclosure.

Inventive Example 1

1.0 mm thick silica sheets were used as a thermal barrier.

Figure 9:
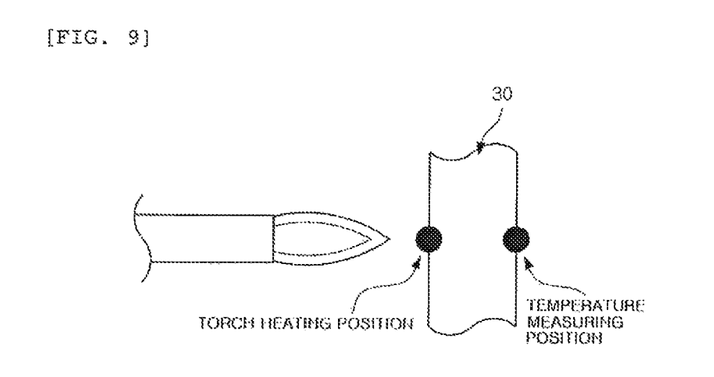
FIG. 9 is a view schematically illustrating a torch heating position and a temperature measurement position in Inventive Examples and Comparative Examples, front and rear surfaces of a thermal barrier.

As illustrated in FIG. 9, while heating to a temperature of 1200° C. using a torch on one surface (front surface) of the thermal barrier, a temperature of a front silica sheet and a temperature of a rear silica sheet in the thermal barrier were measured, and results therefrom were illustrated in Table 1 below.

Inventive Example 2

A thermal barrier was prepared by placing and stacking two 0.5 mm thick silica sheets and a 1.1 mm thick polyurethane foam sheet between the silica sheets.

Temperatures of front and rear surfaces of the thermal barrier were measured with respect to the obtained thermal barrier, in the same manner as in Inventive Example 1, and results therefrom were illustrated in Table 1 below.

Comparative Example 1

A thermal barrier was prepared using a 0.5 mm thick silica sheet.

Temperatures of front and rear surfaces of the thermal barrier were measured with respect to the obtained thermal barrier, in the same manner as in Inventive Example 1, and results therefrom were illustrated in Table 1 below.

Comparative Example 2

A thermal barrier was prepared by placing and stacking two 1.1 mm thick polyurethane foam sheets and a 0.5 mm thick silica sheet between the foam sheets.

Temperatures of front and rear surfaces of the thermal barrier were measured with respect to the obtained thermal barrier, in the same manner as in Inventive Example 1, and results therefrom were illustrated in Table 1 below.

Comparative Example 3

A thermal barrier was prepared by placing and stacking two 2.2 mm thick polyurethane foam sheets.

Temperatures of front and rear surfaces of the thermal barrier were measured with respect to the obtained thermal barrier, in the same manner as in Inventive Example 1, and results therefrom were illustrated in Table 1 below.

TABLE 1

|  | Front Temp. (° C.) | Rear Temp. (° C.) |
|---|---|---|
| Inventive Example 1 | 1000 | 254 |
| Inventive Example 2 | 1000 | 242 |
| Comparative Example 1 | 1000 | 315 |
| Comparative Example 2 | 1000 | 318 |
| Comparative Example 3 | 1000 | 396 |

As can be seen from Table 1, when the thermal barriers of Inventive Examples 1 and 2 having the structure of the present disclosure were included, heat of less than 300° C. was transferred, to significantly lower propagation of heat, and when the thermal barriers of Comparative Examples 1 to 3 were included, it was evaluated that high heat of 300° C. or more was propagated to the rear surface of the thermal barrier. Typically, a boiling point of ethyl methyl carbonate (EMC) of an electrolyte may be 105° C., a separator may be contracted at 155° C., and positive and negative electrodes may react at 175° C., to occur a sign of thermal runaway such as venting or the like. When a surface temperature of a pouch reaches about 300° C., it is estimated that a temperature in the pouch reaches about 175° C. to occur an internal short circuit. Therefore, in Inventive Examples 1 and 2 according to the present disclosure, such a thermal runaway phenomenon may be suppressed.

According to another aspect of the present disclosure, a thermal barrier may be mounted between unit secondary battery cells and, as necessary, between a secondary battery cell and an adjacent secondary battery cell, to prevent transfer of heat or flame to another secondary battery cell under a thermal runaway situation of an ignition situation.

While example embodiments have been illustrated and described above, it will be apparent to those skilled in the art that modifications and variations could be made without departing from the scope of the present disclosure as defined by the appended claims.

What is claimed is:

1. A battery module comprising a cell assembly stacked with a plurality of secondary battery cell; a housing accommodating the cell assembly,
   a thermal barrier is placed in the housing,
   wherein the thermal barrier comprises a first heat resistant layer, a second heat resistant layer, and a rigid mechanical layer disposed between the first and second heat resistant layers,
   wherein the heat resistant layers include at least one mica sheet comprising mica, and the at least one mica sheet directly faces one of the plurality of secondary battery cells.
2. The battery module of claim 1, wherein the secondary battery cell is a pouch-type secondary battery cell in which an electrode assembly is accommodated in a pouch case.
3. The battery module of claim 1, wherein the mica sheet comprises mica in an amount of 90% to 99% by weight and a binder in an amount of 1% to 10% by weight.
4. The battery module of claim 1, wherein each of the first and second heat resistant layers has a thickness of 0.2 to 3.0 mm.
5. The battery module of claim 1, wherein the rigid mechanical layer is at least one of a film, a woven fabric, a non-woven fabric, or a foam, and is made of a material selected from at least one of plastic, steel, ceramic, super wool, and silicone, having a melting point of 150° C. or higher, and
   wherein the rigid mechanical layer is spaced apart from the battery cell.
6. The battery module of claim 5, wherein the plastic is at least one selected from polyethylene terephthalate (PET), polyimide, fluororesin, or carbon-fiber-reinforced-polymers (CFRP) in which a carbon fiber is included in any one thereof.
7. The battery module of claim 1, wherein the rigid mechanical layer has a thickness of 0.1 to 1.0 mm.
8. The battery module of claim 1, wherein the thermal barrier has a thickness of 1.0 to 4.0 mm.
9. The battery module of claim 1, further comprising an adhesive layer between the rigid mechanical layer and the first and second heat resistant layers, or in an outermost portion of the thermal barrier.
10. The battery module of claim 9, wherein the adhesive layer is a pressure sensitive adhesive or a hot melt adhesive made of a silicone-based adhesive, an acrylic-based adhesive, a rubber-based adhesive, or an epoxy-based adhesive.
11. The battery module of claim 1, further comprising a pad layer preventing swelling of the secondary battery cells,
    wherein the pad layer is disposed between the rigid mechanical layer and the heat resistant layers, and
    the pad layer comprises a material different from at least one of the rigid mechanical layer and the heat-resistant layer.
12. The battery module of claim 11, wherein the pad layer has a compressibility of 20 to 50% in a thickness direction of the pad layer.
13. The battery module of claim 1, wherein the thermal barrier is located in at least one of the following
    i) between one secondary battery cell among the plurality of secondary battery cells accommodated in the housing and a neighboring secondary battery cell adjacent thereto;
    ii) between a cell tab of the one secondary battery cell and a cell tab of the neighboring secondary battery cell; and
    iii) in an upper space of the housing above the plurality of secondary battery cells accommodated in the housing.
14. A pack comprising the battery module of claim 13.

* * * * *